US012734526B2

(12) United States Patent
Krauß et al.

(10) Patent No.: US 12,734,526 B2
(45) Date of Patent: Sep. 15, 2026

(54) BETA COMPONENT OF A TRANSFER SYSTEM FOR A STERILE ISOLATION REGION, STERILE ISOLATION REGION, ASEPTIC FILLING SYSTEM, AND A METHOD OF OPERATING SUCH A FILLING SYSTEM

(71) Applicant: Syntegon Technology GmbH, Waiblingen (DE)

(72) Inventors: Ulrich Krauß, Ilshofen (DE); Patrick Holl, Crailsheim (DE); Markus Ilgenfritz, Feuchtwangen (DE); Andreas Bernhard, Herrieden (DE)

(73) Assignee: SYNTEGON TECHNOLOGY GMBH, Waiblingen (DE)

(*) Notice: Subject to any disclaimer, the term of this patent is extended or adjusted under 35 U.S.C. 154(b) by 695 days.

(21) Appl. No.: 18/027,968

(22) PCT Filed: Sep. 16, 2021

(86) PCT No.: PCT/EP2021/075431

§ 371 (c)(1),
(2) Date: Mar. 23, 2023

(87) PCT Pub. No.: WO2022/063667

PCT Pub. Date: Mar. 31, 2022

(65) Prior Publication Data

US 2023/0364619 A1 Nov. 16, 2023

(30) Foreign Application Priority Data

Sep. 23, 2020 (DE) ..................... 10 2020 124 826.1

(51) Int. Cl.
*B01L 3/00* (2006.01)
*B01L 1/02* (2006.01)
(Continued)

(52) U.S. Cl.
CPC ............. *B01L 3/5635* (2013.01); *B01L 1/025* (2013.01); *B65B 3/04* (2013.01); *B65B 55/027* (2013.01);
(Continued)

(58) Field of Classification Search
CPC ............. B01L 3/5635; B01L 2200/026; B01L 2200/0689; B01L 2200/141;
(Continued)

(56) References Cited

U.S. PATENT DOCUMENTS

| | | | |
|---|---|---|---|
| 4,534,389 A | 8/1985 | Tullis | |
| 5,783,156 A | 7/1998 | Renzi | |
| 9,198,992 B2 | 12/2015 | Adams | |
| 2010/0084045 A1 | 4/2010 | Adams | |
| 2011/0209410 A1* | 9/2011 | Norton .................... | G21F 7/005 49/503 |

(Continued)

FOREIGN PATENT DOCUMENTS

| | | |
|---|---|---|
| DE | 19814418 A1 | 10/1999 |
| DE | 69614592 T2 | 5/2002 |

(Continued)

OTHER PUBLICATIONS

German Patent Office Action for Related Application No. 102020124826.1 dated Apr. 19, 2021 (6 pages, including an English statement of relevance).

(Continued)

*Primary Examiner* — Charles Capozzi
*Assistant Examiner* — Alex Ramirez
(74) *Attorney, Agent, or Firm* — MICHAEL BEST & FRIEDRICH LLP

(57) ABSTRACT

The present invention relates to a beta-component of a transfer system for a sterile isolation region, a sterile isolation region, an aseptic filling system, and a method of operating such a filling system.

12 Claims, 4 Drawing Sheets

(51) Int. Cl.
*B65B 3/04* (2006.01)
*B65B 55/02* (2006.01)

(52) U.S. Cl.
CPC . *B01L 2200/026* (2013.01); *B01L 2200/0689* (2013.01); *B01L 2200/141* (2013.01); *B01L 2300/0672* (2013.01); *B01L 2300/0681* (2013.01); *B01L 2300/123* (2013.01)

(58) Field of Classification Search
CPC ..... B01L 2300/0672; B01L 2300/0681; B01L 2300/123; B65B 3/04; B65B 55/027
See application file for complete search history.

(56) References Cited

U.S. PATENT DOCUMENTS

| | | | | |
|---|---|---|---|---|
| 2011/0256021 | A1* | 10/2011 | Adams | A61L 2/07 422/292 |
| 2017/0137765 | A1 | 5/2017 | Tamura | |
| 2017/0248626 | A1 | 8/2017 | Procyshyn et al. | |

FOREIGN PATENT DOCUMENTS

| | | | |
|---|---|---|---|
| EP | 2379120 | B1 | 4/2014 |
| EP | 2735317 | A1 | 5/2014 |
| FR | 3037186 | A1 | 12/2016 |
| WO | 2010054031 | A1 | 5/2010 |

OTHER PUBLICATIONS

International Search Report and Written Opinion for Related Application No. PCT/EP2021/075431 dated Dec. 10. 2021 (15 pages, including an English translation of the international search report).
Baessler, "Chapter 6—Aseptic Transfer Systems Into and Out of Barrier Isolators and Rabs," Containment Technology, Jan. 1, 2013, (pp. 81-104).
Throrogood, "A history of isolator and containment technology Part 4: Transfer devices," Clean Air and Containment Review, Nr. 21, Jan. 31, 2015, (pp. 14-18).
Canadian Patent Office Action for Application No. 3192434 dated Jul. 31, 2024 (6 pages).

* cited by examiner

BETA COMPONENT OF A TRANSFER SYSTEM FOR A STERILE ISOLATION REGION, STERILE ISOLATION REGION, ASEPTIC FILLING SYSTEM, AND A METHOD OF OPERATING SUCH A FILLING SYSTEM

BACKGROUND

The present invention relates to a beta-component of a transfer system for a sterile isolation region, a sterile isolation region, an aseptic filling system, and a method of operating such a filling system.

The filling system is used to fill a flowable medium, also known as a product, into closable containers. The filling process takes place under sterile, germ-free and contamination-free conditions.

Such aseptic filling systems are typically designed with an isolation region closed off from the outside, also known as an isolator. The isolation region or isolator thus forms a closed environment with an atmosphere that meets special requirements for cleanliness and freedom from contamination.

The isolation region is separated from an operating region by a partition or isolator wall. Operating personnel may be present in the operating region; a sterile environment is not available here.

In a filling system, a filling device is arranged in the isolation region, which filling device is designed to fill the medium or product into closable containers by means of a filling needle. The filling device is also referred to as a filling path.

The partition typically comprises an alpha-port of a transfer system, this together with the beta-component forms a type of airlock designed to introduce objects from the operating region into the isolation region, wherein maintaining sterility in the isolator/isolation region.

Up to now, the filling device or filling path for aseptic filling in the isolation region or isolator has been set up by the operating personnel via glove ports, i.e. the operating personnel mount the filling needle in the filling needle holder of the filling device and then connect lines, which are connected to the filling needle, via pumps to the product bag, in which the medium or product to be filled is provided.

In addition to a filling needle, the insertion of other objects may also be necessary.

Pre-assembled and pre-sterilized filling paths are also known. However, here too, the filling path must be installed by the operating personnel via glove ports. Systems are also known in which the filling path is installed in the isolator before the biodecontamination cycle with hydrogen peroxide ($H_2O_2$) and in which the filling needle is taken out automatically after decontamination, e.g. with the aid of a robot, from a quiver located in the isolator. The quiver is attached above the filling needle and is intended to prevent hydrogen peroxide from entering the filling needle and thus the filling tube. The disadvantage of this solution, which is known from practical experience, is that the filling path can be contaminated by $H_2O_2$, since the filling path is already in the isolator during the biodecontamination cycle.

SUMMARY

The object of the present invention is to provide an advantageous way of inserting objects through a transfer system. In particular, the filling needle required in the isolation region should be able to be inserted into this region safely and without contamination.

Transfer systems are used for contamination-free material transfer into and out of isolators. They are considered the safest method for bidirectional transfer in aseptic or toxic work regions without containment and/or violation of sterility.

Transfer systems include two main components, an alpha-port and a beta-component, which when docked create a double-door system.

The alpha-port comprises an alpha-flange and an alpha-closure unit. The alpha-flange is firmly integrated in the partition of the isolation region (in the isolator wall). The alpha-closure unit (similar to a door) is pivotably arranged on the alpha-flange.

The alpha-flange is often formed by a stainless steel flange. The alpha-closure unit is often formed of plastic. The alpha-port is usually equipped with a mechanical safety mechanism that prevents the alpha-closure unit from opening in the absence of a beta-component.

The second major component is the beta-component just mentioned. The beta-component comprises a receiving space, a beta-flange, a casing defining the receiving space, and a beta-closure unit. The beta-closure unit is detachably attached (lid-like) to the beta-flange for opening and closing the receiving space. The beta-closure unit effectively forms a lid that can be detached from the receiving space.

The beta-flange and beta-closure unit are configured for coupling to the alpha-flange and alpha-closure unit of the alpha-port of the transfer system.

During coupling, the beta-flange and alpha-flange as well as the beta-closure unit and alpha-closure unit are connected to each other. When coupled, the beta-closure unit and alpha-closure unit form one closure unit and can only be opened and closed together.

Once the alpha- and beta-components are connected, they form a closed unit. Sealing is ensured, for example, by lip seals of the newly created unit, which can be opened without interrupting sterility enclosure. If the alpha- and beta-components are connected, e.g. by bayonet locks, the lock is released and the closure unit (coupled beta-closure unit and alpha-closure unit) can be opened inside the isolator.

According to the invention, it is now provided that the beta-component has a holding device for holding an object, in particular a filling needle, in a defined position and orientation. The holding device is arranged on a side of the beta-closure unit facing the receiving space, in particular wherein a filling needle is held by the holding device.

This allows an object held in the holding device to be moved into the isolation region by pivoting the closure unit (coupled beta-closure unit and alpha-closure unit). For example, the closure unit can be opened automatically from the inside, i.e. from the side of the isolation region.

According to the invention, a sterile isolation region is also provided with a partition by which it is separated from a non-sterile operating region, wherein the partition comprises an alpha-port of a transfer system for introducing objects from the operating region into the isolation region. In particular, a filling device is arranged in the isolation region, which filling device is designed to fill a medium into closable containers by means of a filling needle. In terms of the invention, a beta-component is coupled to the alpha-port by means of the holding device described above. Upon opening of the closure unit formed by the alpha-closure unit and beta-closure unit coupled to each other, the holding device is moved into the interior of the isolation region. Accordingly, there is no need to reach into the receiving space of the beta-component to remove the held object. When the closure unit (formed by coupled alpha-closure unit and beta-closure unit) is opened, it is pivoted into the isolation region, since the holding device is arranged on the beta-closure unit, it pivots into the isolation region with it and the held object is accessible without spatial restrictions and can be removed there.

According to the invention, a filling system with a sterile isolation region as just described is also provided, wherein a handling device is arranged in the isolation region, which handling device is designed to open the beta-closure unit and the alpha-closure unit in the coupled state (i.e. to open the closure unit formed by the coupled beta-closure unit and alpha-closure unit as described above). Alternatively or additionally, the handling device can also be configured to remove the object held in the holding device, in particular the filling needle, from the holding device and/or to place it therein.

The opening of the closure unit (coupled beta-closure unit and alpha-closure unit) can be automated via an automated opening mechanism that is separate from the handling device and can be actuated from the operating region.

The filling system according to the invention allows a biodecontamination cycle to be carried out in the closed isolation region. This provides a germ-free and contamination-free environment in the isolation region. For example, after the biodecontamination cycle, the beta-component is docked to the alpha-port of the transfer system. Subsequently, the closure unit (coupled beta-closure unit and alpha-closure unit) is opened, for example, by the handling device, for example, by the robot arm. The closure unit can also be opened automatically from the outside (e.g. via a manually operated mechanism or with the aid of a motor).

The filling system can comprise a detection unit which is set up for machine vision and whose field of view comprises at least the transfer system, so that a position of the filling needle can be detected by the detection unit. The handling device can thus take over and/or grip the filling needle in a simplified, automated manner. The movement path of the handling device can be flexibly adapted depending on the position of the filling needle.

It can be provided that the beta-closure unit (or rather the overall closure unit formed by the coupled beta-closure unit and alpha-closure unit) can be transferred to a fixed open position during opening, in which its position is determined. This can be achieved, for example, by means of a stop or an arresting device. The beta-closure unit and thus the holding device fixed to it are correspondingly in a predetermined position in the open state. This simplifies the removal of the object held in the handling device.

The following statements refer to the beta-component, the sterile isolation region, as well as to the filling system. The beta-component can comprise a casing of the receiving space which can be detached from the beta-flange. For example, the casing can be formed by a flexible plastic bag or can be formed by a dimensionally stable sterilizable container. The casing can also be formed as a semi dimensionally stable bellows unit. A casing of this type can be designed to be compressible and/or variable in its extension in the direction towards the beta-flange, but rigid transverse thereto.

The filling needle is typically connected to a tube which extends out of the receiving space. At its end facing away from the filling needle, this tube typically has a sterile-connector for connection to a feed tank. The tube (also referred to as the filling tube) can be returned manually to the receiving space during teardown, but it is also possible for the beta-component to comprise a return device for the filling tube, which, during teardown, i.e. when the filling needle is moved back into the receiving space, also moves the filling tube back into the receiving space. For example, a resilient element can be provided for this purpose, which can be arranged around the filling tube and pull it back into the receiving space during teardown. This prevents the filling tube from being squeezed when the beta-closure unit is closed.

The tube section located in the receiving space is typically longer than the distance of the transfer system from the position of the filling needle, provided in the isolator. If the casing is designed to be form-flexible, for example as a plastic bag, the bag itself can be longer than the distance of the transfer system from the position of the filling needle provided in the isolator. When the filling needle is moved, the bag (casing) can be moved and/or compressed and/or folded towards the transfer system.

During teardown of the filling system or if a filling operation is interrupted, the filling needle can be returned from the handling device to the holding device. The tube can be brought back into the bag, for example by pulling on the compressed bag (beta-bag), so that the beta-closure unit can be closed without the tube being squeezed. This pulling can be performed by the operator outside the isolator without having to reach in the isolator.

Advantages of the invention and its various further developments are the avoidance of errors due to the possibility of automated setup, an increase in product safety due to the possibility of eliminating glove ports. Furthermore, time can be saved in setting up the filling path. By using single-use components, the complete filling path or rather filling needle and tube together with the single-use bag (beta-bag) can be disposed of at the end of production. This is particularly advantageous when filling toxic products. The filling path can be set up after the biodecontamination cycle and is not exposed to H2O2. In other words, the filling needle and tube are outside the isolation region during the decontamination cycle.

The task is also solved, as mentioned above, by a method of operating a filling system as described in this application.

The method comprises the steps:

Attaching the beta-component to the alpha-port in the partition. During this attachment, the filling needle is located in the receiving space of the beta-component in the holding device.

Performing a decontamination cycle in the isolation region, in particular using H2O2. This step can be performed before but in particular after the attachment of the beta-component.

Opening the closure unit (i.e. the overall closure unit formed by the coupled beta-closure unit and alpha-closure unit), in particular by means of the handling device. However, opening is also possible by means of an opening mechanism integrated in the alpha-flange, for example.

Removing the filling needle from the holding device, in particular by means of the handling device.

Placing the filling needle in a needle holding device of the filling device, in particular by means of the handling device.

In particular, removing the filling needle from the needle holding device of the filling device, in particular by means of the handling device;

In particular, placing the filling needle in the receiving space, in particular by means of the handling device, in particular in the holding device.

BRIEF DESCRIPTION OF THE DRAWINGS

The invention is described in more detail below with reference to the figures, wherein identical or functionally identical elements are, if applicable, only marked once with reference signs.

DETAILED DESCRIPTION

Figure 1:
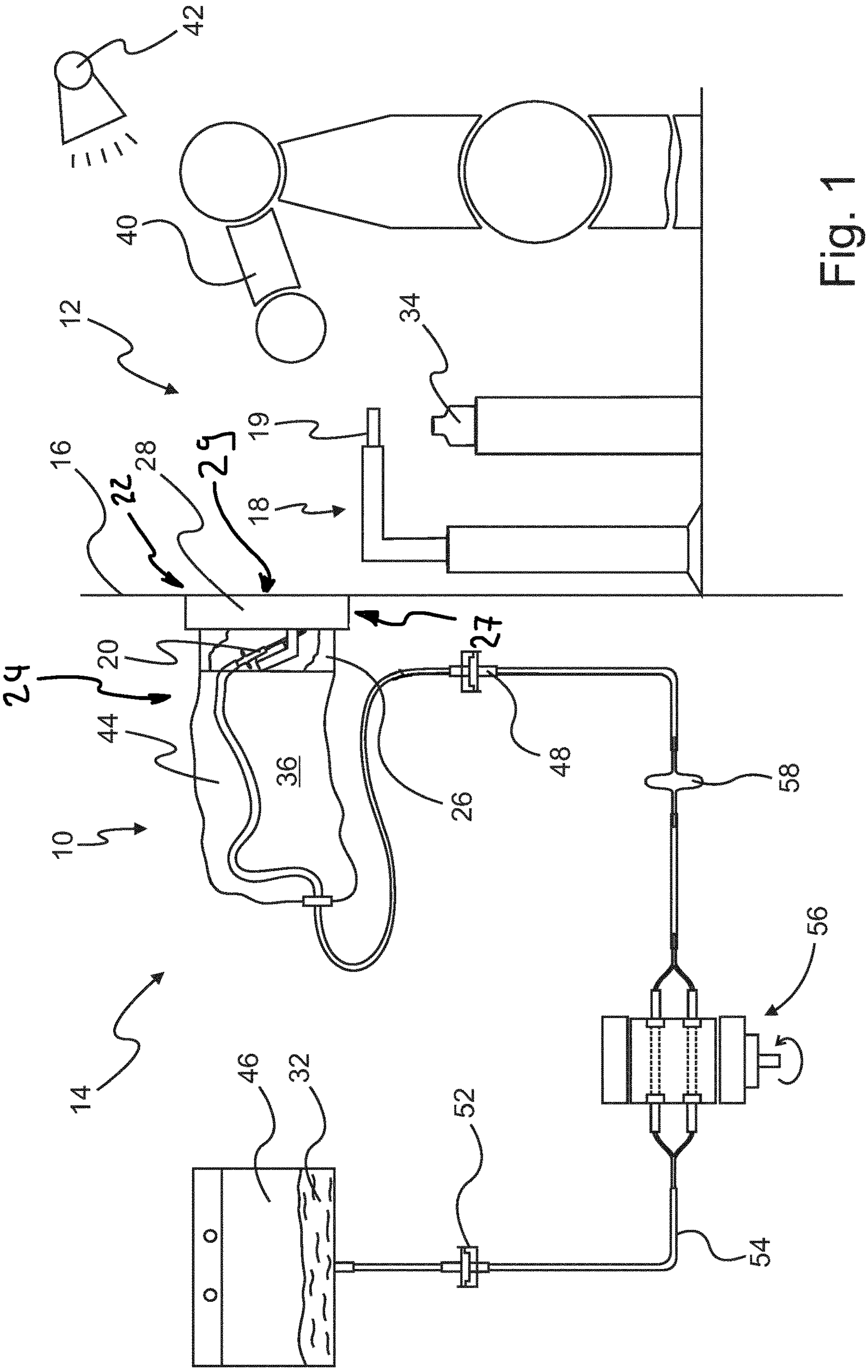
FIG. 1 an aseptic filling system.

FIG. 1 shows an aseptic filling system 10. The filling system 10 is used for filling a medium 32 into closable containers 34. The aseptic filling system 10 is configured with an isolation region 12 closed off from the outside, which is separated from an operating region 14 by a partition 16.

A filling device 18 is arranged in the isolation region 12. In the present case, a handling device 40 is also arranged in the isolation region 12, which will be discussed in detail later.

The filling device 18 comprises a needle holding device 19 which is configured to hold a filling needle 20 and in which the filling needle 20 can be arranged respectively for carrying out filling operations. The needle holding device 19 forms a holder for the filling needle 20. Needle holding device 19 can also be arranged in the filling device 18 in such a way that it is moved by the latter as part of the filling operations.

The partition 16, by which the isolation region 12 is separated from the operating region 14, comprises a transfer system 22. The transfer system 22 is used for the insertion, in particular the aseptic transfer, of objects from the operating region 14 into the isolation region 12.

The transfer system 22 comprises a replaceable beta-component 24 and an alpha-port 27 fixedly disposed in the partition 16.

The replaceable beta-component 24 is configured with a beta-flange 26 (shown partially transparent in FIG. 1). The replaceable beta-component 24 further comprises a detachable respectively openable beta-closure unit 30 (see, for example, FIG. 2). The beta-closure unit 30 is designed in a quasi lid-like manner.

The alpha-port 27, which is fixedly disposed in the partition 16, includes an alpha-flange 28 connected to the partition 16 and an alpha-closure unit 29 which is pivotally movably supported relative to the alpha-flange 28.

The beta-component 24 is configured for coupling with the alpha-port 27 fixedly disposed in the partition 16. For coupling, the beta-flange 26 is sealingly connected to the alpha-flange 28. The Beta-closure unit 30 is connected to alpha-closure unit 29 so that both sealingly abut each other with their respective outer sides and can only be moved together. In the connected state, the beta-closure unit 30 and the alpha-closure unit 29 form a closure unit 31 of the transfer system 22. In the closed state, the alpha-closure unit 29 forms the side of the closure unit 31 facing the isolation region 12, and the beta-closure unit 30 forms the side of the closure unit 31 facing away from the isolation region 12. The closure unit 31 pivots into the isolation region 12 when opened.

To couple the alpha-port 27 and beta-component 24, they are connected to each other by means of a bayonet lock through a rotary movement of the beta-component 24. Thereby, the beta-flange 26 engages sealingly with the alpha-flange 28. Correspondingly, the beta-closure unit 30 engages sealingly with the alpha-closure unit 29. Other coupling methods are likewise within the spirit of the invention.

The beta-component 24 comprises a receiving space 36 accessible via the beta-closure unit 30 and otherwise closed, and a casing 44 of the receiving space 36 detachable from the beta-flange 26. In the present case, the casing 44 is formed by a flexible plastic bag (also referred to as a beta-bag). The casing 44 can also be formed by a dimensionally stable sterilizable container, for example a stainless steel container.

Figure 4:
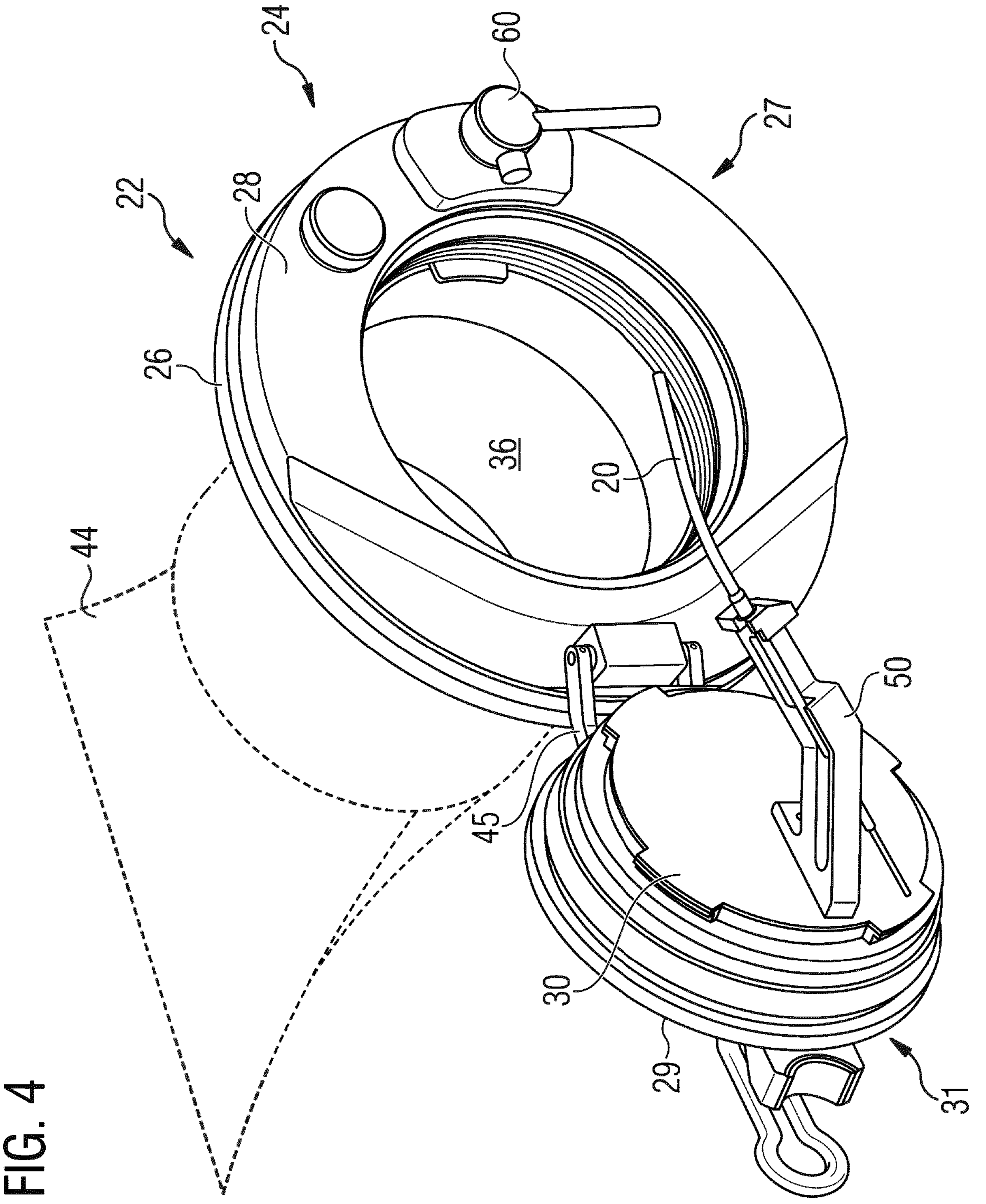
FIG. 4 the transfer system from FIG. 3 in an open state.

The beta-closure unit 30 as part of the closure unit 31 opens and closes the receiving space 36 towards the isolation region 12 in the assembled state. The beta-closure unit 30 is designed as a roundish lid-like unit for this purpose. The alpha-closure unit 29 is pivotably supported on the alpha-flange 28 via a hinge mechanism 45. The beta-closure unit 30 is detachable from the beta-flange 26 so that, when coupled to the alpha-closure unit 29, it follows the pivoting movement of the latter when opened. It is readily apparent from FIG. 4 that the transfer system 22 includes a locking mechanism 60. The locking mechanism 60 can only be unlocked when the alpha-closure unit 29 is coupled to the beta-closure unit 30.

For insertion of the filling needle 20 into the isolation region 12, the filling needle 20 is initially arranged in the beta-component 24 in the receiving space 36. The filling needle 20 is connected to a tube 43 which extends out of the receiving space 36 and comprises a sterile-connector 48 at its end facing away from the filling needle 20 for connection to a feed tank 46.

Figure 3:
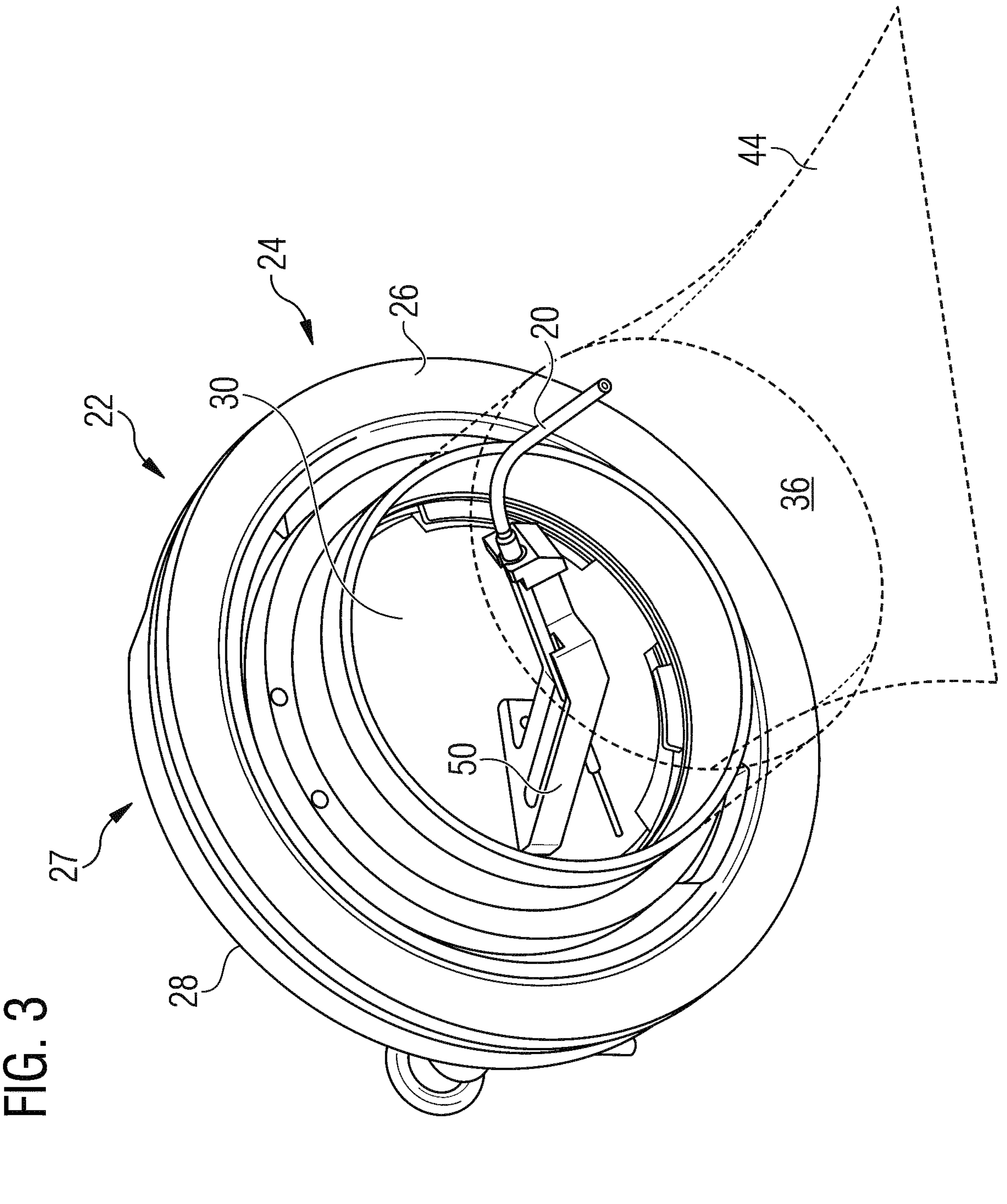
FIG. 3 a transfer system (alpha-port with docked beta-component)

A holding device 50 is arranged in the receiving space 36 of the beta-component 24 for holding the filling needle 20 in a precise position. The holding device 50 is arranged on the detachable beta-closure unit 30, as shown clearly in FIGS. 3 and 4. When the beta-component 24 is coupled to the alpha-port 27 and the closure unit 31 is opened, the filling needle 20 held in the holding device 50 is moved into the isolation region 12.

The handling device 40 arranged in the isolation region 12 is designed as a robot arm in the present case. The handling device 40 is configured to open the closure unit 31 (alpha-closure unit 29 and beta-closure unit 30 connected to each other in the coupled state) and to remove the filling needle 20 from the holding device 50 and insert it into the needle holding device 19. When the use of the filling needle 20 is completed, the filling needle 20 can be moved back into the holding device 50 by means of the handling device 40.

The filling system 10 comprises an optional detection unit 42, which is set up for machine vision and whose field of view comprises the transfer system 22 and, in the present case, the needle holding device 19, so that a position of the filling needle 20 can be detected by the detection unit 42 and the handling device 40 can be controlled and regulated accordingly in order to remove the filling needle 20 from the holding device 50 and place it in the needle holding device 19 and, after completion of use, transfer it back to the holding device 50.

Figure 2:
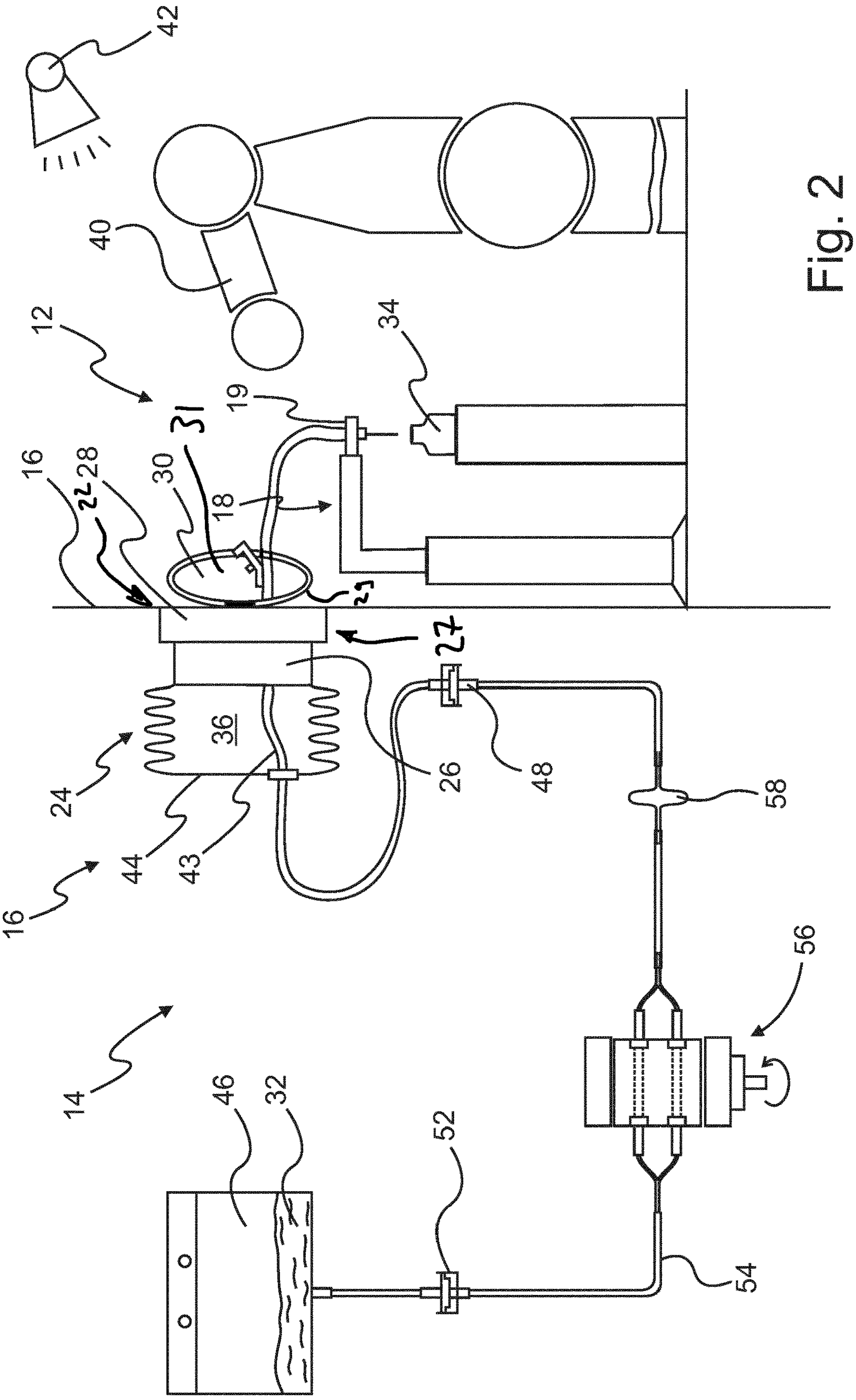
FIG. 2 the aseptic filling system shown in FIG. 1 in an operational state.

When the filling needle 20 is removed, the form-flexible bag-like casing 44 is, so to speak, compressed as the tube 43 is pulled into the isolation region, as shown in FIG. 2.

The casing 44 can also be designed as a semi dimensionally stable bellows unit. A casing 44 of this type can be designed to be compressible and/or variable in its extension in the direction towards the beta-flange 26, but rigid transverse thereto.

The closure unit 31 (or rather the alpha-closure unit 29 and the beta-closure unit 30 coupled to it) can be transferred to a fixed open position during opening, as shown in FIG. 2. In the fixed open position, the alpha-closure unit 29 or rather the overall closure unit 31 and thus also the beta-closure unit 30 and the holding device 50 arranged thereon are determined in their position.

The filling needle 20 is connected via the tube 43 by means of the sterile-connector 48 to the feed tank 46, which contains the medium 32. The feed tank 46 is in turn connected by means of a sterile-connector 52 on the feed tank side to a tube section which passes through a peristaltic pump 56. A medium-filter 58 is arranged in the connecting tube line between the peristaltic pump 56 and the sterile-connector 48 on the side of the filling needle 20.

What is claimed is:

1. A beta-component (24) of a transfer system (22) comprising a receiving space (36), a beta-flange (26), a casing (44) defining the receiving space (36), and a beta-closure unit (30), wherein the beta-closure unit (30) is detachably attached to the beta-flange (26) for opening and closing the receiving space (36), and the beta-flange (26) and the beta-closure unit (30) are configured for coupling to an alpha-flange (28) and an alpha-closure unit (29) of an alpha-port (27) of the transfer system (22), wherein the beta-component (24) comprises a holding device (50) for holding an object (20) in a defined position and orientation, wherein the holding device (50) is arranged on a side of the beta-closure unit (30) facing the receiving space (36).

2. The beta-component (24) according to claim 1, wherein the casing (44) of the receiving space (36) of the beta-component (24) is configured to be detachable from the beta-flange (26).

3. The beta-component (24) according to claim 1, wherein the beta-flange of the beta-component (24) and the alpha-flange (28) of the alpha-port (22) are configured to be connected to each other with a bayonet lock and the beta-closure unit (30) and the alpha-closure unit (29) are configured to be connected to each other with the bayonet lock.

4. The beta-component (24) according to claim 1, wherein the object (20) held by the holding device (50) is a filling needle (20).

5. A sterile isolation region (12) with a partition (16) by which the sterile isolation region is separated from a non-sterile operating region (14), wherein the partition (16) comprises an alpha-port (27) of a transfer system (22) for introducing objects (24) from the operating region (14) into the isolation region (12), wherein a filling device (18) is arranged in the isolation region (12), which filling device (18) is configured to fill a medium (32) into closable containers (34) by a filling needle (20), wherein a beta-component (24) according to claim 1 is coupled to the alpha-port (27), wherein upon opening of a closure unit (31) of the transfer system (22) formed by the alpha-closure unit (29) and beta-closure unit (30) coupled to each other, the holding device (50) is moved into the interior of the isolation region (12).

6. A filling system (10) with a sterile isolation region (12) according to claim 5, wherein a handling device (40) is arranged in the isolation region (12), which handling device (40) is configured to open the beta-closure unit (30) and the alpha-closure unit (29) in the coupled state and/or to remove the object held in the holding device (50) from the holding device (50) and/or to place the object therein.

7. The filling system (10) according to claim 6, further comprising a detection unit (42) which includes machine vision and whose field of view comprises at least the transfer system (22), so that a position and/or orientation of the object can be detected by the detection unit (42).

8. The sterile isolation region (12) according to claim 5, wherein the closure unit (31), which is formed by the alpha-closure unit (29) and beta-closure unit (30) coupled to one another, can be transferred into a fixed open position during opening.

9. A method of operating a filling system (10) according to claim 6, wherein the method comprises the steps of:

attaching the beta-component (24) to the alpha-port (27) in the partition (16), wherein the object (20) is located in the receiving space (36) of the beta-component (24) in the holding device (50);

performing a decontamination cycle in the isolation region (12);

opening the transfer system (22) by the handling device (40);

removing the object (20) by the handling device (40), from the holding device (50);

placing the object (20) in an object holding device (19) of the filling device (18) by the handling device (40).

10. The beta-component (24) according to claim 2, wherein the casing (44) is formed by a flexible plastic bag or is formed by a dimensionally stable sterilizable container.

11. The beta-component (24) according to claim 4, wherein the filling needle (20) is connected to a tube (43) which extends out of the receiving space (36).

12. The beta-component (24) according to claim 11, wherein the tube (43) comprises a sterile connector (48) at an end facing away from the filling needle (20) for connection to a feed tank (46).

* * * * *